US006981034B2

(12) United States Patent
Ding et al.

(10) Patent No.: US 6,981,034 B2
(45) Date of Patent: Dec. 27, 2005

(54) DECENTRALIZED MANAGEMENT ARCHITECTURE FOR A MODULAR COMMUNICATION SYSTEM

(75) Inventors: Da-Hai Ding, Lexington, MA (US); Luc A. Pariseau, Arlington, MA (US); Brenda A. Thompson, Reading, MA (US)

(73) Assignee: Nortel Networks Limited, St. Laurent (CA)

( * ) Notice: Subject to any disclaimer, the term of this patent is extended or adjusted under 35 U.S.C. 154(b) by 62 days.

(21) Appl. No.: 09/343,299

(22) Filed: Jun. 30, 1999

(65) Prior Publication Data

US 2003/0055929 A1 Mar. 20, 2003

(51) Int. Cl.[7] .......... G06F 15/173

(52) U.S. Cl. .......... 709/223; 709/201; 709/224; 709/226; 709/243; 709/249; 370/254; 370/360; 370/386; 714/2; 320/119; 710/107

(58) Field of Search .......... 709/201, 223, 709/226, 243, 249, 224; 370/360, 254, 386; 320/119; 710/107; 714/2

(56) References Cited

U.S. PATENT DOCUMENTS 4,296,475 A 10/1981 Nederlof et al. .......... 364/900
4,597,078 A 6/1986 Kempf .......... 370/94
4,725,834 A 2/1988 Chang et al. .......... 340/825.5
4,827,411 A 5/1989 Arrowood et al.
4,897,841 A 1/1990 Gang, Jr. .......... 370/85.13
5,086,428 A 2/1992 Perlman et al. .......... 370/94.1
5,220,511 A 6/1993 Speckhart et al.
5,222,064 A 6/1993 Sagawa .......... 370/85.13
5,261,052 A 11/1993 Shimamoto et al. .......... 395/200
5,301,273 A 4/1994 Konishi .......... 395/200
5,343,471 A 8/1994 Cassagnol .......... 370/85.13
5,522,042 A * 5/1996 Fee et al. .......... 709/226
5,621,908 A 4/1997 Akaboshi et al.
5,678,006 A 10/1997 Valizadeh et al.
5,689,550 A 11/1997 Garson et al.
5,805,820 A 9/1998 Bellovin et al.
5,812,771 A * 9/1998 Fee et al. .......... 709/201
5,884,036 A 3/1999 Haley
5,909,564 A 6/1999 Alexander et al.
5,923,652 A * 7/1999 Daase et al. .......... 370/360
5,966,710 A 10/1999 Burrows
6,023,148 A * 2/2000 Pignolet .......... 320/119
6,094,659 A 7/2000 Bhatia .......... 707/104
6,098,108 A 8/2000 Sridhar et al. .......... 709/239
6,115,713 A 9/2000 Pascucci et al. .......... 707/10
6,119,188 A * 9/2000 Sheafor et al. .......... 710/107
6,128,296 A 10/2000 Daruwalla et al.
6,131,096 A 10/2000 Ng et al. .......... 707/10

(Continued)

*Primary Examiner*—Ario Etienne
*Assistant Examiner*—Thu Ha Nguyen

(57) ABSTRACT

A decentralized management model enables a plurality of interconnected modules to be managed and controlled as an integrated unit without requiring any one of the interconnected modules to operate as a fully centralized manager. One of the interconnected modules is configured to operate as a base module, which coordinates certain network management operations among the interconnected modules. Each of the interconnected modules is capable of sending and receiving management and control information. Each of the interconnected modules maintains a segmented management database containing network management parameters that are specific to the particular module, and also maintains a shadowed management database containing network management parameters that are common to all of the interconnected modules in the stack. Management and control operations that do not require synchronization or mutual exclusion among the various interconnected modules are typically handled by the module that receives a management/control request. Management and control operations that require synchronization or mutual exclusion among the various interconnected modules are handled by the base module.

38 Claims, 5 Drawing Sheets

U.S. PATENT DOCUMENTS

| | | | | |
|---|---|---|---|---|
| 6,169,794 | B1 | 1/2001 | Oshimi et al. | 379/207 |
| 6,172,981 | B1 | 1/2001 | Cox et al. | 370/401 |
| 6,212,529 | B1 | 4/2001 | Boothby et al. | 707/201 |
| 6,250,548 | B1 | 6/2001 | McClure et al. | 235/51 |
| 6,260,073 | B1 * | 7/2001 | Walker et al. | 709/249 |
| 6,307,931 | B1 | 10/2001 | Vaudreuil | 379/229 |
| 6,308,226 | B1 | 10/2001 | Kainuma | |
| 6,321,227 | B1 | 11/2001 | Ryu | |
| 6,324,693 | B1 | 11/2001 | Brodersen et al. | 717/11 |
| 6,331,983 | B1 | 12/2001 | Haggerty et al. | 370/400 |
| 6,426,955 | B1 | 7/2002 | Gossett Dalton, Jr. et al. | |
| 6,467,006 | B1 | 10/2002 | Alexander et al. | |
| 6,578,086 | B1 | 6/2003 | Regan et al. | |
| 2002/0085586 | A1 | 7/2002 | Tzeng | |
| 2003/0058864 | A1 | 3/2003 | Michels et al. | |

* cited by examiner

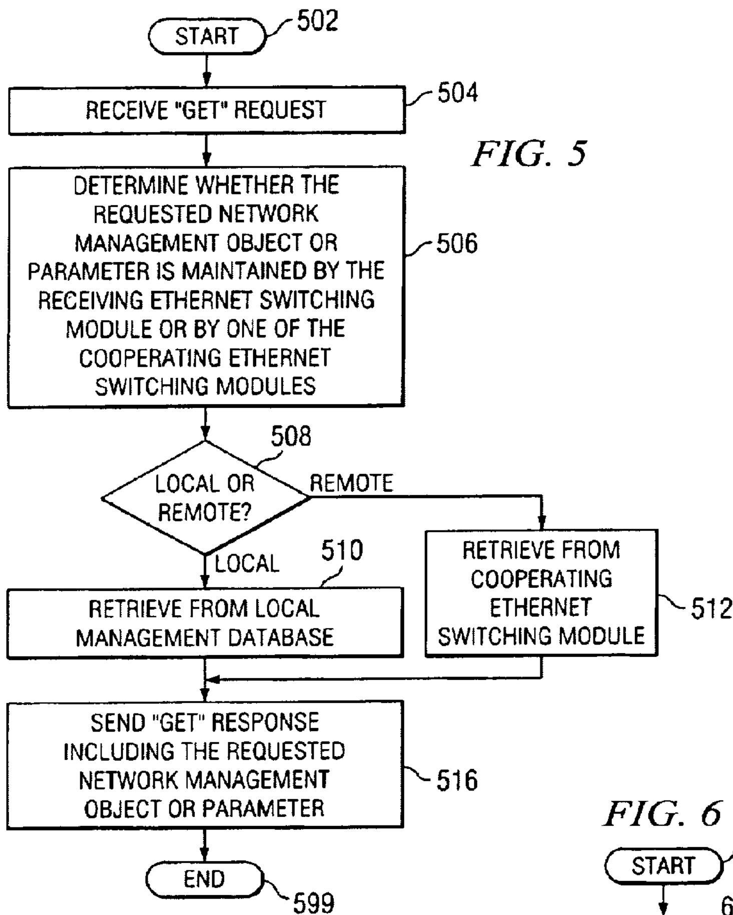
*FIG. 5*
*FIG. 6*
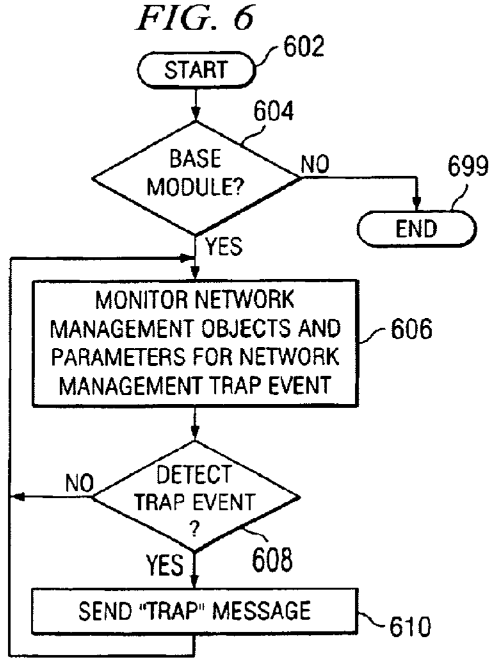

DECENTRALIZED MANAGEMENT ARCHITECTURE FOR A MODULAR COMMUNICATION SYSTEM

CROSS REFERENCE TO RELATED APPLICATIONS

This application is related to patent application entitled "SYSTEM, DEVICE, AND METHOD FOR ADDRESS MANAGEMENT IN A DISTRIBUTED COMMUNICATION ENVIRONMENT, U.S. application Ser. No. 09/340,478, filed on Jun. 30, 1999, which is incorporated herein by reference, and is also related to patent application entitled "SYSTEM, DEVICE, AND METHOD FOR ADDRESS REPORTING IN A DISTRIBUTED COMMUNICATION ENVIRONMENT, U.S. application Ser. No. 09/340,477, filed on Jun. 30, 1999, which is incorporated herein by reference.

FIELD OF THE INVENTION

The present invention relates generally to communication systems, and more particularly to network management in a distributed communication environment.

BACKGROUND OF THE INVENTION

In today's information age, it is typical for computers and computer peripherals to be internetworked over a communication network. The communication network typically includes a plurality of communication links that are interconnected through a number of intermediate devices, such as bridges, routers, or switches. Information sent by a source device to a destination device traverses one or more communication links.

The various communication devices in the communication network, including the computers, computer peripherals, and intermediate devices, utilize various communication protocols in order to transport the information from the source device to the destination device. The communication protocols are typically implemented in layers, which together form a protocol stack. Each protocol layer provides a specific set of services to the protocol layer immediately above it in the protocol stack. Although there are different protocol layering schemes in use today, the different protocol layering schemes have certain common attributes. Specifically, protocols at the lowest layer in the protocol stack, which are typically referred to as the "layer 1" or "physical layer" protocols, define the physical and electrical characteristics for transporting the information from one communication device to another communication device across a single communication link. Protocols at the next layer in the protocol stack, which are typically referred to as the "layer 2" or "Medium Access Control (MAC) layer" protocols, define the protocol message formats for transporting the information across the single communication link by the physical layer protocols. Protocols at the next layer in the protocol stack, which are typically referred to as the "layer 3" or "network layer" protocols, define the protocol message formats for transporting the information end-to-end from the source device to the destination device across multiple communication links. Higher layer protocols ultimately utilize the services provided by the network protocols for transferring information across the communication network.

In order for a communication device to utilize the services of the communication network, the communication device is assigned various addresses that are used by the different protocol layers in the protocol stack. Specifically, each communication device that participates in a MAC layer protocol is assigned a MAC layer address that is used to identify the particular communication device to other communication devices participating in the MAC layer protocol. Furthermore, each communication device that participates in a network layer protocol is assigned a network layer address that is used to identify the particular communication device to other communication devices participating in the network layer protocol. Other addresses may be used at the higher layers of the protocol stack, for example, for directing the information to a particular application within the destination device.

Therefore, in order for the source device to send a message to the destination device, the source device first encapsulates the message into a network layer protocol message (referred to as a "packet" or "datagram" in various network layer protocols). The network layer protocol message typically includes a source network layer address equal to the network layer address of the source device and a destination network layer address equal to the network layer address of the destination device. The source device then encapsulates the network layer protocol message into a MAC layer protocol message (referred to as a "frame" in various MAC layer protocols). The MAC layer protocol message typically includes a source MAC layer address equal to the MAC layer address of the source device and a destination MAC layer address equal to the MAC layer address the destination device. The source device then sends the MAC layer protocol message over the communication link according to a particular physical layer protocol.

In certain situations, the source device and the destination device may be on different communication links. Therefore, an intermediate device receives the MAC layer protocol message from the source device over one communication link and forwards the MAC layer protocol message to the destination device on another communication link based upon the destination MAC layer address. Such an intermediate device is often referred to as a "MAC layer switch."

In order to forward protocol messages across multiple communication links, each intermediate device typically maintains an address database including a number of address entries, where each address entry includes filtering and forwarding information associated with a particular address. A typical address entry maps an address to a corresponding network interface. Such address entries are typically used for forwarding protocol messages by the intermediate device, specifically based upon a destination address in each protocol message. For example, upon receiving a protocol message over a particular incoming network interface and including a particular destination address, the intermediate device finds an address entry for the destination address, and processes the protocol message based upon the filtering and forwarding information in the address entry. The intermediate device may, for example, "drop" the protocol message or forward the protocol message onto an outgoing network interface designated in the address entry.

Because intermediate devices are utilized in a wide range of applications, some intermediate devices utilize a modular design that enables a number of modules to be interconnected in a stack configuration such that the number of interconnected modules interoperate in a cooperating mode of operation to form a single virtual device. Each module is capable of operating independently as a stand-alone device or in a stand-alone mode of operation, and therefore each module is a complete system unto itself. Each module typically supports a number of directly connected communication devices through a number of network interfaces. The modular design approach enables the intermediate device to be scalable, such that modules can be added and removed to fit the requirements of a particular application.

When a number of modules are interconnected in a cooperating mode of operation, it is desirable for the number of interconnected modules to operate and be managed as an integrated unit rather than individually as separate modules. Because each module is capable of operating independently, each module includes all of the components that are necessary for the module to operate autonomously. Thus, each module typically includes a number of interface ports for communicating with the directly connected communication devices, as well as sufficient processing and memory resources for supporting the directly connected communication devices. Each module typically also includes a full protocol stack and network management software that enable the module to be configured and controlled through, for example, a console user interface, a Simple Network Management protocol (SNMP) interface, or world wide web interface.

In order to operate and manage the interconnected modules as an integrated unit, a centralized management approach is often employed. Specifically, a centralized manager coordinates the operation and management of the various interconnected modules. The centralized manager may be, for example, a docking station, a dedicated management module, or even one of the cooperating modules (which is often referred to as a "base module" for the stack).

Such a centralized management approach has a number of disadvantages. A dedicated management module or docking station increases the cost of the stack, and represents a single point of failure for the stack. Adding one or more redundant dedicated management modules to the stack only increases the cost of the stack even further. Similarly, a base module represents a single point of failure for the stack. Also, because the base module is responsible for all management operations and databases for the entire stack, the base module requires additional memory resources (and possibly other resources) to coordinate management and control for the number of interconnected modules in the stack, which increases the cost of the base module. Adding one or more redundant base modules to the stack only increases the cost of the stack even further. Furthermore, the centralized management approach requires the centralized manager to collect information from all of the modules, and therefore requires a substantial amount of communication between the centralized manager and the (other) interconnected modules in the stack.

Thus, a need remains for an efficient management architecture for operating and managing a number of interconnected modules as an integrated unit.

SUMMARY OF THE INVENTION

In accordance with one aspect of the invention, a distributed management model enables a plurality of interconnected modules to be managed and controlled as an integrated unit without requiring any one of the interconnected modules to operate as a fully centralized manager. One of the interconnected modules is configured to operate as a base module, which coordinates certain network management operations among the interconnected modules. Each of the interconnected modules is capable of sending and receiving management and control information. Each of the interconnected modules maintains essentially the same set of parameters whether operating as the base module, as a cooperating module, or in a stand-alone mode. For convenience, network management parameters that are specific to a particular module are maintained in a "segmented" management database, while network management parameters that are system-wide aggregates are maintained in a "shadowed" management database. Management and control operations that do not require synchronization or mutual exclusion among the various interconnected modules are typically handled by the module that receives a management/control request. Management and control operations that require synchronization or mutual exclusion among the various interconnected modules are handled by the base module.

The distributed management approach of the present invention has a number of advantages over a centralized management approach. Each module is capable of acting as a base module, and therefore the base module does not represent a single point of failure for the stack. Also, each module maintains essentially the same parameters whether operating as the base module, a cooperating module, or in a stand-alone mode, and therefore no additional memory resources are required for a module to operate as the base module. Furthermore, because the module-specific parameters are not maintained across all of the interconnected modules, the amount of inter-module communication is substantially reduced. These and other advantages will become apparent below.

BRIEF DESCRIPTION OF THE DRAWINGS

The foregoing and other objects and advantages of the invention will be appreciated more fully from the following further description thereof with reference to the accompanying drawings wherein:

FIG. 5 is a logic flow diagram showing exemplary logic for processing a "get" request in accordance with a preferred embodiment of the present invention;

FIG. 6 is a logic flow diagram showing exemplary logic for generating "trap" messages in accordance with a preferred embodiment of the present invention;

DETAILED DESCRIPTION OF A PREFERRED EMBODIMENT

The management techniques of the present invention enable the stack to be managed and controlled as an integrated unit without requiring any one of the cooperating modules to operate as a fully centralized manager for the stack. Specifically, each of the cooperating modules runs a full TCP/IP protocol stack and uses a common IP address, so that each of the cooperating modules is capable of sending and receiving management and control information on behalf of the stack. Each of the cooperating modules maintains a segmented management database containing network management parameters that are specific to the particular module (module-specific parameters), and also maintains a shadowed management database containing network management parameters that are common to all cooperating modules in the stack (stack-wide parameters). Management and control operations that do not require synchronization or mutual exclusion among the various cooperating modules are typically handled by the module that receives a management/control request, although management and control operations that require synchronization or mutual exclusion among the various cooperating modules are handled by a base module in the stack.

In a preferred embodiment of the present invention, the management techniques of the present invention are used to coordinate management and control in a modular Ethernet switching system including a number of interconnected Ethernet switching modules.

In a preferred embodiment of the present invention, each Ethernet switching module is a particular device that is known as the BayStack™ 450 stackable Ethernet switch. The preferred Ethernet switching module can be configured to operate as an independent stand-alone device, or alternatively up to eight (8) Ethernet switching modules can be interconnected in a stack configuration, preferably by interconnecting the up to eight (8) Ethernet switching modules through a dual ring bus having a bandwidth of 2.5 gigabits per second. Within the stack configuration, a particular Ethernet switching module can be configured to operate in either a stand-alone mode, in which the particular Ethernet switching module performs Ethernet switching independently of the other Ethernet switching modules in the stack, or a cooperating mode, in which the particular Ethernet switching module performs Ethernet switching in conjunction with other cooperating Ethernet switching modules. Furthermore, a particular Ethernet switching module in the stack can be dynamically reconfigured between the stand-alone mode and the cooperating mode without performing a system reset or power cycle of the particular Ethernet switching module, and Ethernet switching modules can be dynamically added to the stack and removed from the stack without performing a system reset or power cycle of the other Ethernet switching modules in the stack.

Figure 1:
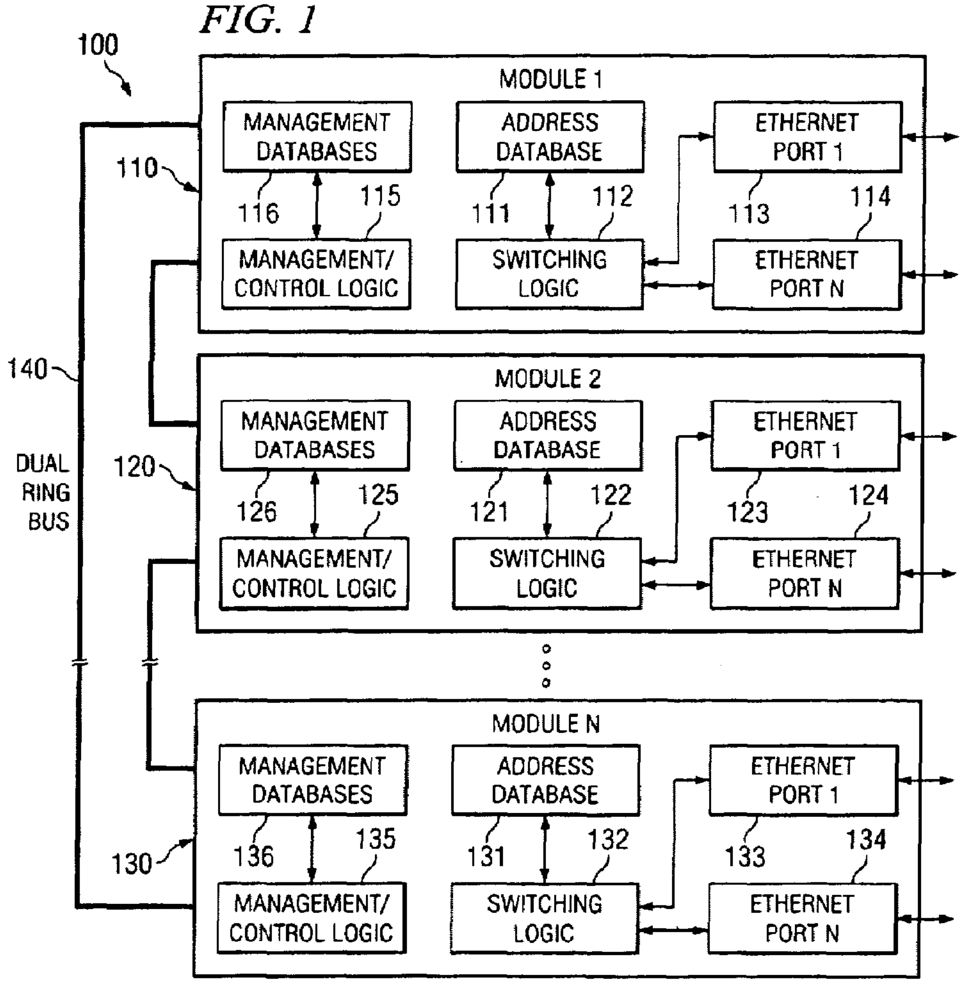
FIG. 1 is a block diagram showing an exemplary stack configuration including a number of interconnected Ethernet switching modules in accordance with a preferred embodiment of the present invention.

FIG. 1 shows an exemplary stack configuration 100 including a number Ethernet switching modules 1 through N that are interconnected through a dual ring bus 140. As shown in FIG. 1, each Ethernet switching module (110, 120, 130) supports a number of physical Ethernet ports (113, 114, 123, 124, 133, 134). Each physical Ethernet port is attached to an Ethernet Local Area Network (LAN) on which there are a number of directly connected communication devices (not shown in FIG. 1). Thus, each directly connected communication device is associated with a particular physical Ethernet port on a particular Ethernet switching module.

Each Ethernet switching module (110, 120, 130) also maintains an address database (111, 121, 131). In a preferred Ethernet switching module, the address database is an address table supporting up to 32K address entries. The address entries are indexed using a hashing function. The address database for a cooperating Ethernet switching module typically includes both locally owned address entries and remotely owned address entries.

Each Ethernet switching module (110, 120, 130) also includes switching logic (112, 122, 132) for processing Ethernet frames that are received over its associated physical Ethernet ports (113, 114, 123, 124, 133, 134) or from a cooperating Ethernet switching module. Specifically, the switching logic (112, 122, 132) performs filtering and forwarding of Ethernet frames based upon, among other things, the destination address in each Ethernet frame and the address entries in the address database (111, 121, 131). When the switching logic (112, 122, 132) receives an Ethernet frame over one of its associated Ethernet ports (113, 114, 123, 124, 133, 134), the switching logic (112, 122, 132) searches for an address entry in the address database (111, 121, 131) that maps the destination address in the Ethernet frame to one of the associated Ethernet ports or to one of the cooperating Ethernet switching modules. If the destination address is on the same Ethernet port (113, 114, 123, 124, 133, 134) over which the Ethernet frame was received, then the switching logic (112, 122, 132) "drops" the Ethernet frame. If the destination address is on a different one of the associated Ethernet ports (113, 114, 123, 124, 133, 134), then the switching logic (112, 122, 132) forwards the Ethernet frame to that Ethernet port (113, 114, 123, 124, 133, 134). If the destination address is on one of the cooperating Ethernet switching modules (110, 120, 130), then the switching logic (112, 122, 132) forwards the Ethernet frame to that cooperating Ethernet switching module (110, 120, 130). If the switching logic (112, 122, 132) does not find an address entry in the address database (111, 121, 131) for the destination address, then the switching logic (112, 122, 132) forwards the Ethernet frame to all associated Ethernet ports (113, 114, 123, 124, 133, 134) except for the Ethernet port over which the Ethernet frame was received and to all cooperating Ethernet switching modules (110, 120, 130).

Because each Ethernet switching module (110, 120, 130) can be configured to operate as an independent stand-alone device or in a stand-alone mode within the stack, each Ethernet switching module (110, 120, 130) includes management/control logic (115, 125, 135) that enables the Ethernet switching module (110, 120, 130) to be individually managed and controlled, for example, through a console user interface, a Simple Network Management protocol (SNMP) session, or a world wide web session. Therefore, the preferred management/control logic (115, 125, 135) includes, among other things, a Transmission Control Protocol/Internet Protocol (TCP/IP) stack, an SNMP agent, and a web engine. Furthermore, each Ethernet switching module (110, 120, 130) is assigned MAC and IP addresses, allowing each Ethernet switching module (110, 120, 130) to send and receive management and control information independently of the other Ethernet switching modules (110, 120, 130).

The management/control logic (115, 125, 135) maintains a number of management databases (116, 126, 136) for storing configuration and operational information. The management/control logic (116, 126, 136) maintains a management database containing network management objects and parameters that are related to a particular port or interface, and maintains another management database containing network management objects and parameters that are system-wide in scope. When the Ethernet switching module (110, 120, 130) is operating in a cooperating mode within the stack, the management database containing network management objects and parameters that are system-wide in scope is referred to as the "shadowed" management database, and the management database containing network management objects and parameters that are related to a particular port or interface is referred to as the "segmented" management database. The management databases (116, 126, 136) are described in more detail below.

The management/control logic (115, 125, 135) interfaces with the other components of the Ethernet switching module (110, 120, 130) in order to manage and control the operations of the Ethernet switching module (110, 120, 130). Specifically, the management/control logic (115, 125, 135) interfaces to the address database (111, 121, 131), the switching logic (112, 122, 132), the physical Ethernet ports (113, 114, 123, 124, 133, 134), and other components of the Ethernet switching module (not shown in FIG. 1) in order to configure, monitor, and report the operational status of the Ethernet switching module (110, 120, 130) and of the individual components of the Ethernet switching module (110, 120, 130). For convenience, the various interconnections between the management/control logic (115, 125, 135) and the various other components are omitted from FIG. 1.

When operating in a stack configuration, it is often necessary for the cooperating Ethernet switching modules (110, 120, 130) to transfer information (including management information, control information, and data) over the dual-ring bus 140. Therefore, the management/control logic (115, 125, 135) provides an Inter-Module Communication (IMC) service. The IMC service supports both reliable (acknowledged) and unreliable transfers over the dual-ring bus 140. IMC information can be directed to a particular Ethernet switching module (i.e., unicast) or to all Ethernet switching modules (i.e., broadcast).

In a preferred embodiment of the present invention, a distributed management model is utilized to enable the cooperating Ethernet switching modules (110, 120, 130) to be managed and controlled as an integrated unit without requiring any one of the cooperating Ethernet switching modules to operate as a fully centralized manager for the stack. In accordance with the distributed management model of the present invention, each of the cooperating Ethernet switching modules runs a full TCP/IP protocol stack and uses a common IP address, so that each of the cooperating Ethernet switching modules is capable of sending and receiving management and control information on behalf of the stack. Each of the cooperating Ethernet switching modules maintains a segmented management database containing network management parameters that are specific to the particular Ethernet switching module (module-specific parameters), and also maintains a shadowed management database containing network management parameters that are common to all cooperating Ethernet switching modules in the stack (stack-wide parameters). Management and control operations that do not require synchronization or mutual exclusion among the various cooperating Ethernet switching modules are typically handled by the Ethernet switching module that receives a management/control request, although management and control operations that require synchronization or mutual exclusion among the various cooperating Ethernet switching modules are handled by a base module in the stack.

In order to coordinate management and control operations across the various cooperating Ethernet switching modules in the stack, one of the cooperating Ethernet switching modules operates as the base module for the stack. In a preferred embodiment of the present invention, a particular Ethernet switching module is configured as the base module through a user controlled toggle switch on the Ethernet switching module. If that Ethernet switching module fails, then another Ethernet switching module (preferably the next upstream Ethernet switching module in the stack) automatically reconfigures itself to become the base module for the stack.

The base module is responsible for coordinating management and control for the stack. Specifically, the base module manages the stack configuration by ensuring that the stack is initialized in an orderly manner, handling stack configuration changes such as module insertion and removal, and verifying stack integrity. The base module also coordinates certain stack management functions that require synchronization or mutual exclusion among the various cooperating Ethernet switching modules in the stack.

As discussed above, each of the cooperating Ethernet switching modules in the stack runs a full TCP/IP protocol stack. In order for the stack to be managed and controlled as an integrated unit, each of the cooperating Ethernet switching modules uses the MAC and IP addresses of the base module. Each Ethernet switching module is allocated a block of thirty-two (32) MAC addresses. One of the thirty-two (32) MAC addresses is reserved for use when the module operates as the base module, while the remaining MAC addresses are used for stand-alone operation. The common IP address enables each of the cooperating Ethernet switching modules to operate as a management interface for the stack.

Also as discussed above, each of the cooperating Ethernet switching modules maintains a segmented management database containing module-specific parameters and a shadowed management database containing stack-wide parameters. The preferred Ethernet switching module supports various standard and private Management Information Base (MIB) objects and parameters. Standard MIB objects include those MIB objects defined in IETF RFCs 1213, 1493, 1757, and 1643. Private MIB objects include those MIB objects defined in the BayS5ChasMIB, BayS5AgentMIB, and Rapid City VLAN MIB. Certain MIB objects and parameters are related to a particular port or interface, and are maintained in the segmented management database by the Ethernet switching module that supports the particular port or interface. Other MIB objects and parameters have stack-wide significance, and are maintained in the shadowed management database by each of the cooperating Ethernet switching modules. It should be noted that the network management information maintained by a cooperating Ethernet switching module is equivalent to the network management information that the Ethernet switching module would maintain when operating as a stand-alone device or in a stand-alone mode of operation, and therefore no additional memory resources are required for the Ethernet switching module to operate in the cooperating mode using the distributed management model of the present invention.

In order for the various cooperating Ethernet switching modules to be managed and controlled as an integrated unit under the distributed management model of the present invention, certain management and control operations require special handling. Briefly, certain management and control operations can be handled by the receiving Ethernet switching module alone. Other management and control operations can be handled by the receiving Ethernet switching module, but require some amount of inter-module communication or coordination. Still other management and control operations (such as those that require synchronization or mutual exclusion among the various cooperating Ethernet switching modules) are handled by the base module, and therefore the receiving Ethernet switching module redirects such management and control operations to the base module. Specific cases are described in detail below.

A first case involves the management of stack-wide parameters. Because each of the cooperating Ethernet switching modules maintains a shadowed management database containing the stack-wide parameters, it is necessary for the various shadowed management databases to be synchronized such that they contain consistent information. Certain network management parameters (such as the sysDesc MIB object) do not change, and are simply replicated in each of the shadowed management databases. Other network management parameters (such as certain MIB objects in the MIB II IP table) are calculated based upon information from each of the cooperating Ethernet switching modules. In order for such aggregated stack-wide parameters to be calculated and synchronized across the various cooperating Ethernet switching modules, each of the cooperating Ethernet switching modules periodically distributes its portion of information to each of the other cooperating Ethernet switching modules. Each of the cooperating Ethernet switching modules then independently calculates the aggregated network management parameters based upon the information from each of the cooperating Ethernet switching modules.

A second case involves the processing of a "get" request (i.e., a request to read a network management parameter) that is received by a particular Ethernet switching module from the console user interface or from an SNMP or web session. Since each of the cooperating Ethernet switching modules runs a full TCP/IP protocol stack, the "get" request can be received by any of the cooperating Ethernet switching modules. If the requested network management object is either a stack-wide parameter or a module-specific parameter that is maintained by the receiving Ethernet switching module, then the receiving Ethernet switching module retrieves the requested network management object from its locally maintained shadowed management database or segmented management database, respectively. Otherwise, the receiving Ethernet switching module retrieves the requested network management object from the appropriate cooperating Ethernet switching module. In a preferred embodiment of the present invention, a Remote Procedure Call (RPC) service is used by the receiving Ethernet switching module to retrieve the requested network management object from the cooperating Ethernet switching module. The RPC service utilizes acknowledged IMC services for reliability. The receiving Ethernet switching module makes an RPC service call in order to retrieve one or more network management objects from the cooperating Ethernet switching module. The RPC service uses IMC services to send a request to the cooperating Ethernet switching module, and suspends the calling application in the receiving Ethernet switching module (by making the appropriate operating system call) until the response is received from the cooperating Ethernet switching module. In order to reduce the amount of RPC traffic over the dual-ring bus 140, the receiving Ethernet switching module may retrieve multiple network management objects during each RPC service call, in which case the receiving Ethernet switching module caches the multiple network management objects. This allows the receiving Ethernet switching module to handle subsequent "get-next" requests (i.e., a request for a next network management object in a series network management objects) without requiring the receiving Ethernet switching module to make additional RPC service calls to retrieve those network management objects from the cooperating Ethernet switching module.

A special case of "get" request processing involves the reporting of address-to-port-number mappings for the stack. As described above, each of the cooperating Ethernet switching modules maintains an address database (111, 121, 131). The related patent application entitled SYSTEM, DEVICE, AND METHOD FOR ADDRESS MANAGEMENT IN A DISTRIBUTED COMMUNICATION ENVIRONMENT, which was incorporated by reference above, describes a technique for synchronizing the address databases (111, 121, 131). However, even though the address databases (111, 121, 131) are synchronized to include the same set of addresses, the actual address entries in each of the address databases (111, 121, 131) are different, since each address database includes a number of locally-owned address entries that map locally-owned addresses to their corresponding Ethernet ports and a number of remotely-owned address entries that map remotely-owned addresses to their corresponding Ethernet switching module. Therefore, in order for a particular Ethernet switching module to report a lexicographically ordered list of address-to-port-number mappings, the Ethernet switching module retrieves and sorts address-to-port-number mappings from each of the cooperating Ethernet switching modules (including the reporting Ethernet switching module itself), preferably using address reporting techniques described in the related patent application entitled SYSTEM, DEVICE, AND METHOD FOR ADDRESS REPORTING IN A DISTRIBUTED COMMUNICATION ENVIRONMENT, which was incorporated by reference above.

A third case involves the sending of "trap" messages (i.e., messages intended to alert the network manager regarding particular network management events). Since each of the cooperating Ethernet switching modules runs a full TCP/IP protocol stack, each of the cooperating Ethernet switching modules is capable of generating "trap" messages. However, in order to coordinate the generation of "trap" messages across the various cooperating Ethernet switching modules and prevent the network manager from receiving multiple "trap" messages for the same network management event (or even conflicting "trap" messages regarding the same network management event), all trap processing is performed by the base module. Specifically, the base module monitors a predetermined set of network management parameters and compares the predetermined set of network management parameters to a predetermined set of trap criteria. When the base module determines that a "trappable" network management event has occurred, the base module generates the "trap" message on behalf of all of the cooperating Ethernet switching modules in the stack.

A fourth case involves the processing of a "set" request (i.e., a request to write a network management parameter)

that is received by a particular Ethernet switching module from the console user interface or from an SNMP or web session. Since each of the cooperating Ethernet switching modules runs a full TCP/IP protocol stack, the "set" request can be received by any of the cooperating Ethernet switching modules. Because "set" requests often require synchronization or mutual exclusion among the various cooperating Ethernet switching modules, a preferred embodiment of the present invention funnels all "set" requests through the base module. Therefore, if the receiving Ethernet switching module is not the base module, then the receiving Ethernet switching module forwards the "set" request to the base module.

In order to ensure that the "set" request is consistent with the current operating state of the stack, each module includes a Global Data Synchronization (GDS) application. The GDS application uses the local management databases together with a predetermined set of rules in order to determine whether or not the particular "set" operation dictated by the "set" request can be executed. Specifically, the GDS application screens for any conflicts that would result from executing the "set" operation, such as an inconsistency among multiple interrelated parameters or a conflict with prior network management configuration.

In a preferred embodiment of the present invention, the receiving Ethernet switching module forwards the "set" request to either the local GDS application or to the GDS application in the base module based upon the source of the "set" request. If the "set" request was received from the console user interface, then the receiving Ethernet switching module forwards the "set" request to the local GDS application, which verifies the "set" request and forwards the "set" request to the base module if the "set" operation can be executed. Otherwise, the receiving Ethernet switching module forwards the "set" request to the GDS application in the base module. When the "set" operation is completed, then the cooperating Ethernet switching modules are notified of any required database updates and/or configuration changes via an acknowledged broadcast IMC message. Each of the cooperating Ethernet switching modules (including the base module) updates its management databases accordingly. Any "set" operation that involves configuration of or interaction with a particular hardware element is carried out by the Ethernet switching module that supports the particular hardware element.

A fifth case involves the use of Address Resolution Protocol (ARP). ARP is a well-known protocol that is used to obtain the MAC address for a device based upon the IP address of the device. Each of the cooperating Ethernet switching modules maintains an ARP cache (not shown in the figures) that maps a set of IP addresses to their corresponding MAC addresses.

In order to obtain the MAC address for a particular IP device (assuming the MAC address is not in the ARP cache), a particular Ethernet switching module broadcasts an ARP request over all Ethernet ports in the stack. The ARP request includes, among other things, the MAC and IP addresses of the stack as well as the IP address of the destination device. The ARP response, which includes the MAC address of the destination device, may be received over any Ethernet port, and therefore may be received by any of the cooperating Ethernet switching modules. The receiving Ethernet switching module distributes the received ARP response to all of the cooperating Ethernet switching modules in the stack. This ensures that the ARP response is received by the Ethernet switching module that initiated the ARP request. Each of the cooperating Ethernet switching modules updates its ARP cache based upon the MAC-IP address binding in the ARP response.

The base module also broadcasts an ARP request when the base module configures the stack, for example, during initial stack configuration or when the stack is reconfigured following a failure of the designated base module (referred to hereinafter as a "fail-over" and described in detail below). When the base module configures the stack, the base module broadcasts an ARP request including, among other things, the MAC address and IP address for the stack. Even though such an ARP request is not used to obtain a MAC address, it does cause all receiving devices to update their respective ARP caches with the new MAC-IP address binding.

A sixth case involves responding to an ARP request. An ARP request may be received over any Ethernet port, and therefore may be received by any of the cooperating Ethernet switching modules. The received ARP request includes the MAC and IP addresses of the device that initiated the ARP request as well as the IP address of the stack. The receiving Ethernet switching module sends an ARP response including the MAC address of the stack, and also distributes the received ARP request to all of the cooperating Ethernet switching modules in the stack. Each of the cooperating Ethernet switching modules updates its ARP cache based upon the MAC-IP address binding in the ARP request.

A seventh case involves the processing of Bootstrap protocol (BOOTP) response messages. BOOTP is a well-known protocol that is used by a device to obtain certain initializing information, such as an IP address. In a preferred embodiment of the present invention, the base module may be configured to always use BOOTP to obtain its IP address, to use BOOTP to obtain its IP address only when no IP address is configured, or to never use BOOTP to obtain its IP address. When BOOTP is used, the base module broadcasts a BOOTP request over all Ethernet ports in the stack. The BOOTP response may be received over any Ethernet port, and therefore may be received by any of the cooperating Ethernet switching modules. The receiving Ethernet switching module redirects the received BOOTP response to the base module. This ensures that the BOOTP response is received by the base module.

An eighth case involves the processing of Trivial File Transfer protocol (TFTP) response messages for software downline load. TFTP is a well-known protocol that is used for transferring files, and in a preferred embodiment of the present invention, is used to perform software upgrades (i.e., software downline load). Specifically, a particular module (which may or may not be the base module) establishes a TFTP connection to a host computer (i.e., a load host) and retrieves an executable software image from the load host. The module distributed the executable software image to the other cooperating Ethernet switching modules over the dual-ring bus.

A ninth case involves the processing of TELNET messages. TELNET is a well-known remote terminal protocol that can be used to set up a remote control terminal port (CTP) session for managing and controlling the stack. Because each of the cooperating Ethernet switching modules supports a full TCP/IP protocol stack, TELNET requests can be received by any of the cooperating Ethernet switching modules. The receiving Ethernet switching module redirects all TELNET messages to the base module so that the base module can coordinate all TELNET sessions.

A tenth case involves the processing of web messages. Web messages can be received by any of the cooperating Ethernet switching modules. The receiving Ethernet switching module redirects all web messages to the base module so that the base module can coordinate all web sessions.

An eleventh case involves "fail-over" to an alternate base module when the designated base module fails. In a preferred embodiment of the present invention, when the designated base module fails, the next upstream Ethernet switching modules takes over as the base module for the stack. When this occurs, it is preferable to continue using the same IP address, since various devices in the network are configured to use that IP address for communicating with the stack. However, the MAC address of the stack changes to a MAC address associated with the new base module. Therefore, when the new base module reconfigures the stack, the new base module broadcasts an ARP request including the stack IP address and the new MAC address.

In order to redirect certain messages to the base module for processing, each of the cooperating Ethernet switching modules includes IP Service logic that processes messages at the IP layer of the TCP/IP protocol stack and directs each message to either a local handler in the receiving Ethernet switching module or to the base module based upon the message type. More specifically, the IP Service logic processes each IP datagram that is received by the cooperating Ethernet switching module. The IP Service logic determines the message type for the IP datagram by determining whether the IP datagram contains a User Datagram Protocol (UDP) user datagram or Transmission Control Protocol (TCP) segment, and then determining the UDP or TCP port number that identifies the particular application for the message. The IP Service logic then forwards the message based upon the message type. In a preferred embodiment of the present invention, the IP Service logic redirects BOOTP replies, TFTP responses, SNMP "set" requests, TELNET messages, and web messages to the base module, and forwards all other messages to the appropriate local handler for the message type.

Figure 2:
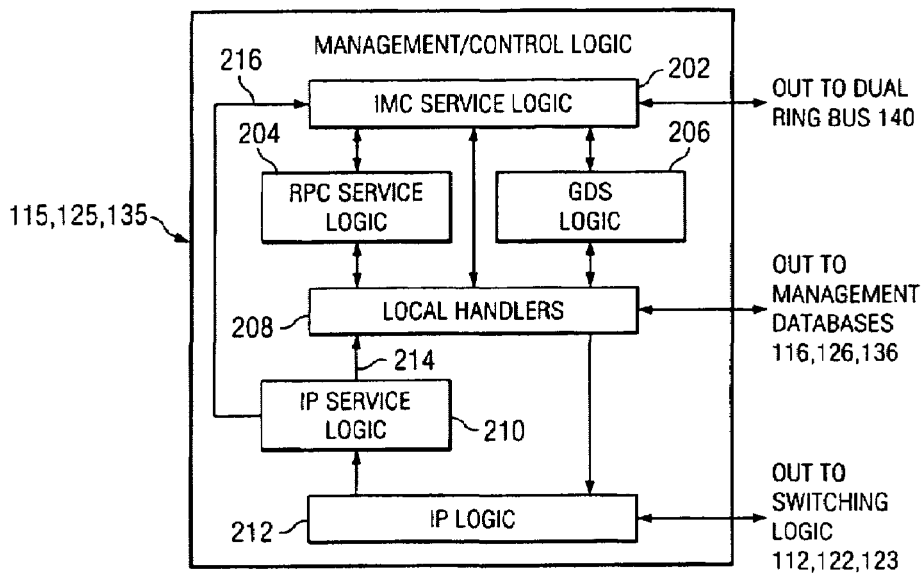
FIG. 2 is a block diagram showing some of the relevant logic blocks of the management/control logic in accordance with a preferred embodiment of the present invention.

FIG. 2 is a block diagram showing some of the relevant logic blocks of the management/control logic (115, 125, 135). The management/control logic (115, 125, 135) includes, among other things, IMC Service Logic 202, RPC Service Logic 204, GDS Logic 206, Local Handlers 208, IP Service Logic 210, and IP Logic 212. The IMC Service Logic 202 enables the management/control logic (115, 125, 135) to exchange network management information with the other cooperating Ethernet switching modules over the dual ring bus 140. The IP Logic 212 enables the management/control logic (115, 125, 135) to exchange network management information with other IP devices in the network via the switching logic (112, 122, 132). The Local Handlers 208 includes logic for generating, maintaining, and processing network management information. The Local Handlers 208 includes, among other things, the UDP logic, TCP logic, SNMP logic, BOOTP logic, TFTP logic, ARP logic, TELNET logic, web logic, console user interface logic, and management database interface logic for managing network management objects and parameters in the management databases (116, 126, 136). The Local Handlers 208 are operably coupled to the IP Logic 212 for sending and receiving IP datagrams over the network. The Local Handlers 208 are operably coupled to the IMC Service Logic 202 for sending and receiving IMC messages over the dual ring bus 140. The Local Handlers 208 are operably coupled to the RPC Service Logic 204 for making and receiving remote procedure calls over the dual ring bus 140. The GDS Logic 206 processes "set" requests for the Local Handlers 208 or for another cooperating Ethernet switching module.

Figure 3:
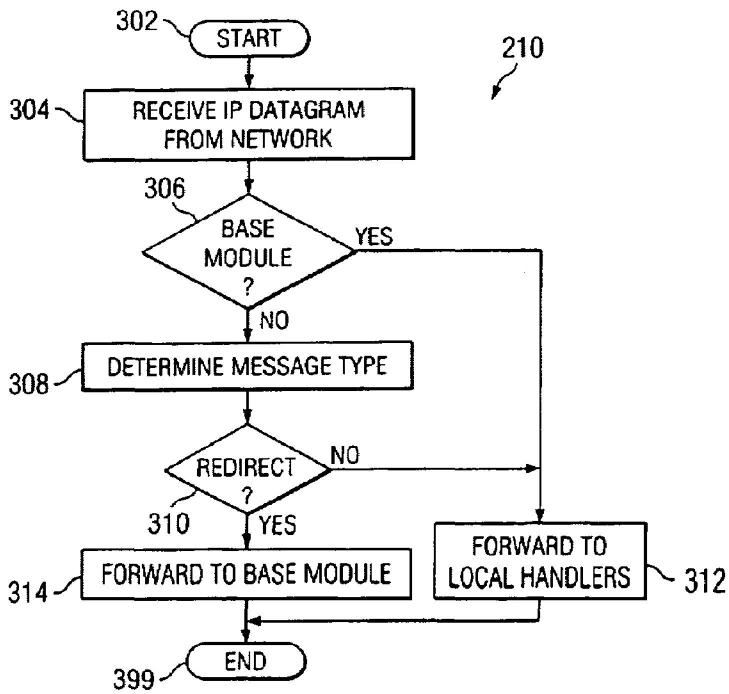
FIG. 3 is a logic flow diagram showing exemplary logic for processing an IP datagram that is received from the network in accordance with a preferred embodiment of the present invention.

Each IP datagram received by the IP Logic 212 is processed by the IP Service logic 210. The IP Service logic 210 forwards the IP datagram to either the Local Handlers 208 via the interface 214 or the base module via the interface 216 using IMC services provided by the IMC Service Logic 202. FIG. 3 is a logic flow diagram showing exemplary IP Service Logic 210 for processing an IP datagram that is received from the network. Beginning in step 302, and upon receiving an IP datagram from the network in step 304, the IP Service Logic 210 determines whether the Ethernet switching module is operating as the base module, in step 306. If the Ethernet switching module is operating as the base module (YES in step 306), then the IP Service Logic 210 forwards the IP datagram to the Local Handlers 208, in step 312, and terminates in step 399. If the Ethernet switching module is not operating as the base module (NO in step 306), then the IP Service Logic 210 determines the message type for the IP datagram, in step 308, and determines whether or not to redirect the IP datagram to the base module based upon the message type, in step 310. If the IP Service Logic 210 determines that the IP datagram is one of the messages that requires redirection to the base module (YES in step 310), then the IP Service Logic 210 forwards the IP datagram to the base module, in step 314, and terminates in step 399. If the IP Service Logic 210 determines that the IP datagram is not one of the messages that requires redirection to the base module (NO in step 310), then the IP Service Logic 210 forwards the IP datagram to the Local Handlers 208, in step 312, and terminates in step 399.

Figure 4A:
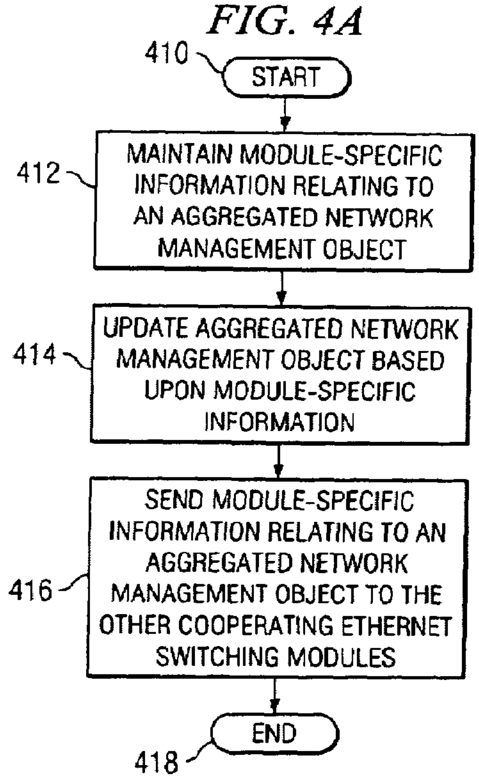
FIG. 4A is a logic flow diagram showing exemplary logic for maintaining an aggregated network management object based upon module-specific information in accordance with a preferred embodiment of the present invention.
Figure 4B:
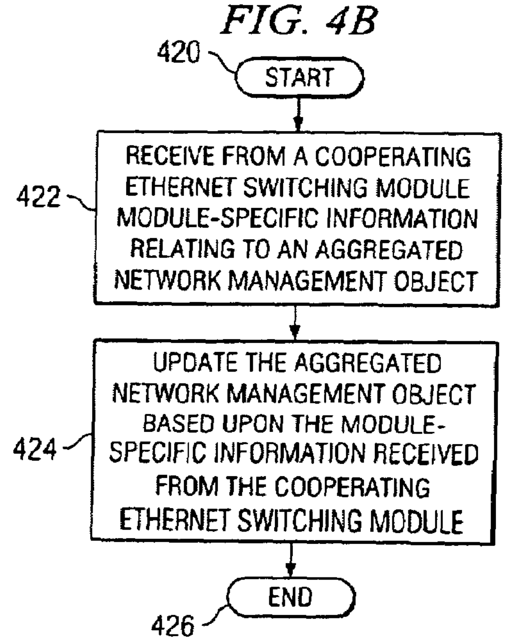
FIG. 4B is a logic flow diagram showing exemplary logic for maintaining an aggregated network management object based upon information received from a cooperating Ethernet switching module in accordance with a preferred embodiment of the present invention.

As described above, certain network management objects and parameters are aggregates of information from each of the cooperating Ethernet switching modules. Therefore, each of the cooperating Ethernet switching modules periodically distributes its portion of information to each of the other cooperating Ethernet switching modules, and each of the cooperating Ethernet switching modules independently calculates the aggregated network management parameters based upon the information from each of the cooperating Ethernet switching modules. FIGS. 4A and 4B are logic flow diagrams showing exemplary management/control logic (115, 125, 135) for maintaining network management objects and parameters that are aggregated across the cooperating Ethernet switching modules. As shown in FIG. 4A, the management/control logic (115, 125, 135) maintains module-specific information relating to an aggregated network management object, in step 412, updates the aggregated network management object based upon the module-specific information, in step 414, and sends the module-specific information relating to an aggregated network management object to the other cooperating Ethernet switching modules, in step 416. As shown in FIG. 4B, the management/control logic (115, 125, 135) receives from a cooperating Ethernet switching module the module-specific information relating to an aggregated network management object, in step 422, and updates the aggregated network management object based upon the module-specific information received from the cooperating Ethernet switching module, in step 424.

Also as described above, certain "get" requests require special processing by the management/control logic (115, 125, 135). Specifically, because network management information that is specific to a particular port or interface is maintained by the module that supports the particular port or interface, the management/control logic (115, 125, 135) may need to retrieve network management information from another cooperating Ethernet switching module in order to process and respond to a "get" request. FIG. 5 is a logic flow diagram showing exemplary management/control logic (115, 125, 135) for processing a "get" request. Beginning in step 502, and upon receiving a "get" request, the management/control logic (115, 125, 135) determines whether the requested network management object or parameter is maintained by the receiving Ethernet switching module or by one of the other cooperating Ethernet switching modules, in step 506. If the request network management object or parameter is maintained by the receiving Ethernet switching module (LOCAL in step 508), then the management/control logic (115, 125, 135) retrieves the requested network management object or parameter from the local management database, in step 510. If the requested network management object or parameter is maintained by one of the other cooperating Ethernet switching modules (REMOTE in step 508), then the management/control logic (115, 125, 135) retrieves the requested network management object or parameter from the cooperating Ethernet switching module, in step 512, specifically using the RPC service. After retrieving the requested network management object or parameter, the management/control logic (115, 125, 135) sends a "get" response message, in step 516, and terminates in step 599.

Also as described above, the base module is responsible for generating "trap" messages on behalf of the stack. FIG. 6 is a logic flow diagram showing exemplary management/control logic (115, 125, 135) logic for generating "trap" messages. The logic begins in step 602. If the Ethernet switching module is operating as the base module (YES in step 604), then the management/control logic (115, 125, 135) monitors the network management objects and parameters for a network management trap event, in step 606. Upon detecting a network management trap event (YES in step 608), the management/control logic (115, 125, 135) sends a "trap" message, in step 610, and returns to step 606 to continue monitoring for network management trap events.

Also as described above, ARP processing requires special handling. Specifically, each ARP request or response received by a particular Ethernet switching module is distributed to the other cooperating Ethernet switching modules so that the ARP message is seen by any Ethernet switching module that needs to see it, and also so that each of the cooperating Ethernet switching modules can update its ARP cache with the MAC-IP binding from the ARP message.

Figure 7A:
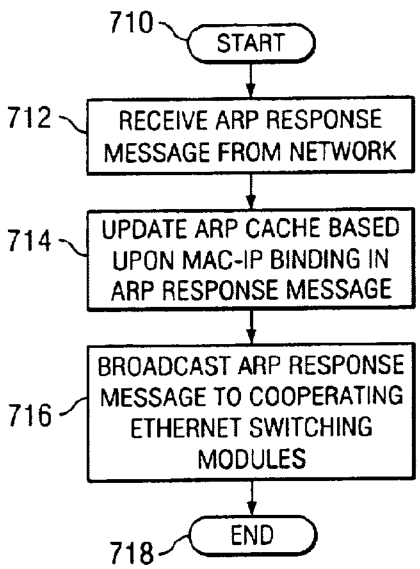
FIG. 7A is a logic flow diagram showing exemplary logic for processing an Address Resolution Protocol response message received from the network, in accordance with a preferred embodiment of the present invention.

FIG. 7A is a logic flow diagram showing exemplary management/control logic (115, 125, 135) logic for processing an ARP response message. Beginning in step 710, and upon receiving an ARP response message, in step 712, the management/control logic (115, 125, 135) updates its ARP cache based upon the MAC-IP binding in the ARP response message, in step 714, and distributes the ARP response message to the cooperating Ethernet switching modules, in step 716. The logic terminates in step 718.

Figure 7B:
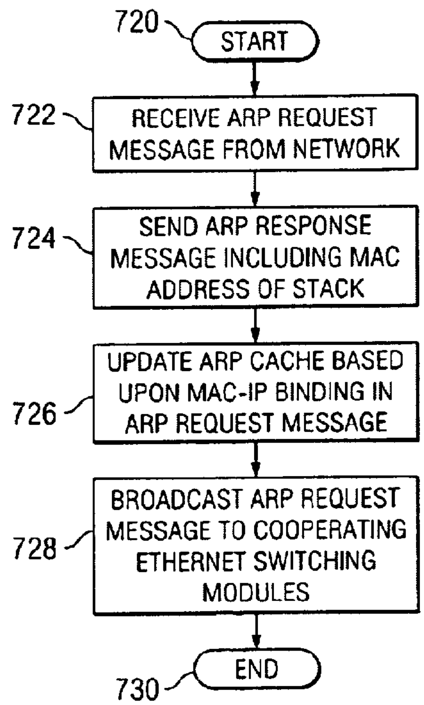
FIG. 7B is a logic flow diagram showing exemplary logic for processing an Address Resolution Protocol request message received from the network, in accordance with a preferred embodiment of the present invention.

FIG. 7B is a logic flow diagram showing exemplary management/control logic (115, 125, 135) for processing an ARP request message. Beginning in step 720, and upon receiving an ARP request message, in step 722, the management/control logic (115, 125, 135) sends an ARP response message including the MAC address of the stack, in step 724. The management/control logic (115, 125, 135) then updates its ARP cache based upon the MAC-IP binding in the ARP request message, in step 726, and distributes the ARP response message to the cooperating Ethernet switching modules, in step 728. The logic terminates in step 730.

Figure 7C:
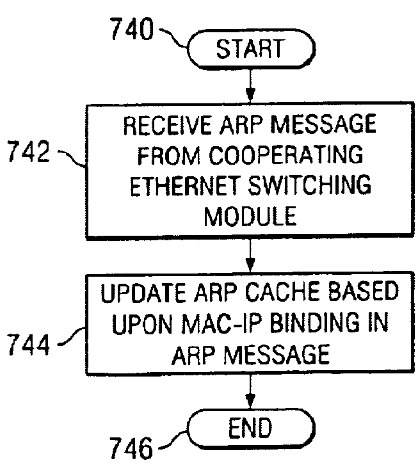
FIG. 7C is a logic flow diagram showing exemplary logic for processing an Address Resolution Protocol message received from a cooperating Ethernet switching module, in accordance with a preferred embodiment of the present invention.

FIG. 7C is a logic flow diagram showing exemplary management/control logic (115, 125, 135) for processing an ARP message from another cooperating Ethernet switching module. The management/control logic (115, 125, 135) begins in step 740, and upon receiving the ARP message from the cooperating Ethernet switching module, in step 742, updates the ARP cache based upon the MAC-IP binding in the ARP message, in step 744. The logic terminates in step 746.

Also as described above, the base module is responsible for broadcasting an ARP request including the MAC address and IP address of the stack following configuration or reconfiguration of the stack. Specifically, when the designated base module fails, the next upstream Ethernet switching modules takes over as the base module for the stack. When this occurs, it is preferable to continue using the same IP address, since various devices in the network are configured to use that IP address for communicating with the stack. However, the MAC address of the stack changes to a MAC address associated with the new base module. Therefore, when the new base module reconfigures the stack, the new base module broadcasts an ARP request including the stack IP address and the new MAC address.

Figure 8:
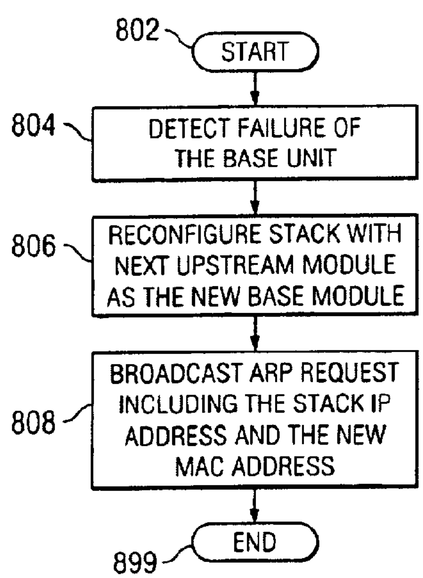
FIG. 8 is a logic flow diagram showing exemplary logic for reconfiguring the stack following a failure of the designated base module in accordance with a preferred embodiment of the present invention.

FIG. 8 is a logic flow diagram showing exemplary management/control logic (115, 125, 135) for generating an ARP request as part of a "fail-over" procedure. Beginning in step 802, and upon detecting a failure of the base unit in step 804, the management/control logic (115, 125, 135) in the next upstream module reconfigures the stack, in step 806, and broadcasts an ARP request including the stack IP address and the new MAC address for the stack, in step 808. The logic terminates in step 899.

In a preferred embodiment of the present invention, predominantly all of the management/control logic (115, 125, 135) is implemented as a set of computer program instructions that are stored in a computer readable medium and executed by an embedded microprocessor system within the Ethernet switching module (110, 120, 130). Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Thus, the present invention may be embodied as a decentralized management method for operating and managing a plurality of interconnected modules as an integrated unit. The decentralized management method involves maintaining, by each module, a number of module-specific parameters in a database; maintaining, by each module, a number of stack-wide parameters in a database; and maintaining, by each module, a management interface for managing the plurality of interconnected modules. In order to maintain the number of stack-wide parameters, each module maintains a portion of information relating to a stack-wide parameter, distributes to the other cooperating modules the portion of information relating to the stack-wide parameter, and calculates the stack-wide parameter based upon the portion of information maintained by the module and the portions of information received from each of the other cooperating modules. Upon receiving a request to read a parameter, a receiving module determines whether the requested parameter is maintained by the receiving module or a cooperating module, retrieves the requested parameter from the database if the requested parameter is maintained by the receiving module, retrieves the requested parameter from a cooperating module if the requested parameter is maintained by the cooperating module (preferably using a remote procedure call), and sends a response including the requested parameter. The request to read the parameter may be an SNMP get or get-next request. Upon receiving an Address Resolution Protocol message, a receiving module sends the Address Resolution Protocol message to the other cooperating modules, and each module updates an Address Resolution Protocol cache based upon a Medium Access Control address and Internet Protocol address included in the Address Resolution Protocol message. One of the modules may be designated as a base module for the plurality of interconnected modules. Among other things, the base module monitors a predetermined set of parameters, compares the predetermined set of parameters to a predetermined set of trap criteria, and generates a trap message upon determining that the predetermined set of parameters meets a trap criterion. Also, upon receiving a request requiring synchronization or mutual exclusion among the plurality of interconnected modules, a receiving module (other than the base module) forwards the request to the base module. The request may be a request to write a parameter (such as an SNMP set request), a BOOTP response message, a TELNET message, or a web message. Furthermore, upon receiving a TFTP response message during a software upgrade procedure, the receiving module distributes the TFTP response message to the other cooperating modules. When the base module configures or reconfigures the stack, the base module broadcasts an ARP request including the stack IP address and the (new) stack MAC address.

The present invention may also be embodied as a module for operating in a communication system having a plurality of interconnected modules including a base module and at least one non-base module. The module may be either a base module or a non-base module. The module includes at least one management database and management/control logic, where the management/control logic includes database interface logic for maintaining a number of module-specific objects and parameters and a number of stack-wide objects and parameters in the at least one management database, management interface logic for enabling the management/control logic to communicate with a network manager, inter-module communication logic for enabling the management/control logic to communicate with the plurality of interconnected modules, local handlers for processing network management information received from the network manager via the management interface logic and from the other interconnected modules via the inter-module communication logic and sending network management information to the other interconnected modules, and service logic for receiving a protocol message from the management interface logic and directing the protocol message to the local handlers, if the module is the base module or the protocol message is not one of a number of protocol messages requiring synchronization or mutual exclusion among the various interconnected modules, and to the base module via the inter-module communication logic, if the module is a non-base module and the protocol message is one of the number of protocol messages requiring synchronization or mutual exclusion among the various interconnected modules. If the protocol message is a request to read a parameter (such as an SNMP get or get-next request), then the service logic forwards the protocol message to the local handlers, which determine whether the requested parameter is maintained by the module or by a cooperating module, retrieve the requested parameter from the at least one management database via the database interface logic if the requested parameters is maintained by the module, retrieve the requested parameter from the cooperating module via the inter-module communication logic if the requested parameter is maintained by the cooperating module, and send a response including the requested parameter. If the module is a non-base module and the protocol message is a request requiring synchronization or mutual exclusion among the plurality of interconnected modules (such as a request to write a parameter, a BOOTP response message, a TELNET message, or a web message), then the service logic forwards the protocol message to the base module via the inter-module communication logic. If the protocol message is an Address Resolution Protocol message or a TFTP response message, then the service logic forwards the Address Resolution Protocol message or TFTP response message to the local handlers, which in turn distribute the the Address Resolution Protocol message or TFTP response message to the plurality of interconnected modules via the inter-module communication logic. If the module is the base module, then the local handlers monitor a predetermined set of parameters, compare the predetermined set of parameters to a predetermined set of trap criteria, and generate a trap message upon determining that the predetermined set of parameters meets a trap criterion. In each module, the local handlers maintain a portion of information relating to a stack-wide parameter, distribute the portion of information to the other cooperating modules via the inter-module communication logic, receive from the other cooperating modules via the inter-module communication logic portions of information relating to the stack-wide parameter, and calculate the stack-wide parameter based upon the portion of information maintained by the module and the portions of information received from each of the other cooperating modules.

The present invention may further be embodied as a computer program product comprising a computer readable medium having embodied therein a computer program for managing a module operating among a plurality of interconnected modules including a base module and at least one non-base module. The computer program comprises database interface logic programmed to maintain a number of module-specific objects and parameters and a number of stack-wide objects and parameters in a management database, management interface logic programmed to communicate with a network manager, inter-module communication logic programmed to communicate with the plurality of interconnected modules, local handlers programmed to process network management information received from the network manager via the management interface logic and from the other interconnected modules via the inter-module communication logic and to send network management information to the other interconnected modules, and service logic programmed to receive a protocol message from the management interface logic and to direct the protocol message to the local handlers, if the module is the base module or the protocol message is not one of a number of protocol messages requiring synchronization or mutual exclusion among the various interconnected modules, and to the base module via the inter-module communication logic, if the module is a non-base module and the protocol message is one of the number of protocol messages requiring synchronization or mutual exclusion among the various interconnected modules. If the protocol message is a request to read a parameter (such as an SNMP get or get-next request), then the service logic forwards the protocol message to the local handlers, which determine whether the requested parameter is maintained by the module or by a cooperating module, retrieve the requested parameter from the at least one management database via the database interface logic if the requested parameters is maintained by the module, retrieve the requested parameter from the cooperating module via the inter-module communication logic if the requested parameter is maintained by the cooperating module, and send a response including the requested parameter. If the module is a non-base module and the protocol message is a request requiring synchronization or mutual exclusion among the plurality of interconnected modules (such as a request to write a parameter, a BOOTP response message, a TELNET message, or a web message), then the service logic forwards the protocol message to the base module via the inter-module communication logic. If the protocol message is an Address Resolution Protocol message or a TFTP response message, then the service logic forwards the Address Resolution Protocol message or TFTP response message to the local handlers, which in turn distribute the the Address Resolution Protocol message or TFTP response message to the plurality of interconnected modules via the inter-module communication logic. If the module is the base module, then the local handlers monitor a predetermined set of parameters, compare the predetermined set of parameters to a predetermined set of trap criteria, and generate a trap message upon determining that the predetermined set of parameters meets a trap criterion. In each module, the local handlers maintain a portion of information relating to a stack-wide parameter, distribute the portion of information to the other cooperating modules via the inter-module communication logic, receive from the other cooperating modules via the inter-module communication logic portions of information relating to the stack-wide parameter, and calculate the stack-wide parameter based upon the portion of information maintained by the module and the portions of information received from each of the other cooperating modules.

The present invention may additionally be embodied as a communication system having a plurality of interconnected modules, wherein each module maintains a number of module-specific parameters, a number of stack-wide parameters, and a management interface for managing the plurality of interconnected modules. In order to maintain the number of stack-wide parameters, each module maintains a portion of information relating to a stack-wide parameter, distributes to the other cooperating modules the portion of information relating to the stack-wide parameter, and calculates the stack-wide parameter based upon the portion of information maintained by the module and the portions of information received from each of the other cooperating modules. Upon receiving a request to read a parameter, a receiving module determines whether the requested parameter is maintained by the receiving module or a cooperating module, retrieves the requested parameter from the database if the requested parameter is maintained by the receiving module, retrieves the requested parameter from a cooperating module if the requested parameter is maintained by the cooperating module (preferably using a remote procedure call), and sends a response including the requested parameter. The request to read the parameter may be an SNMP get or get-next request. Upon receiving an Address Resolution Protocol message, a receiving module sends the Address Resolution Protocol message to the other cooperating modules, and each module updates an Address Resolution Protocol cache based upon a Medium Access Control address and Internet Protocol address included in the Address Resolution Protocol message. One of the modules may be designated as a base module for the plurality of interconnected modules. Among other things, the base module monitors a predetermined set of parameters, compares the predetermined set of parameters to a predetermined set of trap criteria, and generates a trap message upon determining that the predetermined set of parameters meets a trap criterion. Also, upon receiving a request requiring synchronization or mutual exclusion among the plurality of interconnected modules, a receiving module (other than the base module) forwards the request to the base module. The request may be a request to write a parameter (such as an SNMP set request), a BOOTP response message, a TELNET message, or a web message. Furthermore, upon receiving a TFTP response message during a software upgrade procedure, the receiving module distributes the TFTP response message to the other cooperating modules. When the base module configures or reconfigures the stack, the base module broadcasts an ARP request including the stack IP address and the (new) stack MAC address.

The present invention may be embodied in other specific forms without departing from the essence or essential characteristics. The described embodiments are to be considered in all respects only as illustrative and not restrictive.

We claim:

1. A module for operating in a communication system having a plurality of interconnected modules including a base module and at least one non-base module, the module comprising:

at least one management database; and management/control logic, wherein the management/control logic comprises:

database interface logic operably coupled to the at least one management database for maintaining a number of module-specific objects and parameters and a number of stack-wide objects and parameters comprising at least one network management object, the stack-wide objects and parameters being common to the base module and the at least one non-base module;

management interface logic operably coupled to enable the management/control logic to communicate with a network manager;

inter-module communication logic operably coupled to enable the management/control logic to communicate with the plurality of interconnected modules;

local handlers operably coupled to process network management information received from the network manager via the management interface logic and from other interconnected modules via the inter-module communication logic, and to send network management information to the other interconnected modules; and service logic operably coupled to receive a protocol message from the management interface logic and to direct the protocol message to the local handlers, if the module is the base module or the protocol message is not one of a number of protocol messages requiring synchronization or mutual exclusion among various interconnected modules, and direct the protocol message to the base module via the inter-module communication logic, if the module is a non-base module and the protocol message is one of the number of protocol messages requiring synchronization or mutual exclusion among various interconnected modules.

2. The module of claim 1, wherein:

the protocol message is a request to read a parameter; and the service logic is operably coupled to forward the protocol message to the local handlers.

3. The module of claim 2, wherein the request to read the parameter is a Simple Network Management Protocol get request.

4. The module of claim 2, wherein the request to read the parameter is a Simple Network Management Protocol get-next request.

5. The module of claim 2, wherein the local handlers are operably coupled to determine whether the requested parameter is maintained by the module or by a cooperating module; retrieve the requested parameter from the at least one management database via the database interface logic, if the requested parameters is maintained by the module; retrieve the requested parameter from the cooperating module via the inter-module communication logic, if the requested parameter is maintained by the cooperating module; and send a response including the requested parameter.

6. The module of claim 1, wherein:

the module is a non-base module;

the protocol message is a request requiring synchronization or mutual exclusion among the plurality of interconnected modules; and the service logic is operably coupled to forward the protocol message to the base module via the inter-module communication logic.

7. The module of claim 6, wherein the request is a request to write a parameter.

8. The module of claim 7, wherein the request to write the parameter is a Simple Network Management Protocol set request.

9. The module of claim 6, wherein the request is a Bootstrap Protocol response message.

10. The module of claim 6, wherein the request is a TELNET message.

11. The module of claim 6, wherein the request is a web message.

12. The module of claim 1, wherein:

the protocol message is an Address Resolution Protocol message; and the service logic is operably coupled to forward the Address Resolution Protocol message to the local handlers.

13. The module of claim 12, wherein the local handlers are operably coupled to distribute the Address Resolution Protocol message to the plurality of interconnected modules via the inter-module communication logic.

14. The module of claim 1, wherein:

the module is the base module;

the local handlers are operably coupled to monitor a predetermined set of parameters, compare the predetermined set of parameters to a predetermined set of trap criteria, and generate a trap message upon determining that the predetermined set of parameters meets a trap criterion.

15. The module of claim 1, wherein the local handlers are operably coupled to maintain a portion of information relating to a stack-wide parameter, distributed the portion of information to the other cooperating modules via the inter-module communication logic, receive from the other cooperating modules via the inter-module communication logic portions of information relating to the stack-wide parameter, and calculate the stuck-wide parameter based upon the portion of information maintained by the module and the portions of information received from each of the other cooperating modules.

16. The module of claim 1, wherein:

the protocol message is Trivial File Transfer Protocol response message; and the service logic is operably coupled to forward the Trivial File Transfer Protocol response message to the local handlers.

17. The module of claim 16, wherein the local handlers are operably coupled to distribute the Trivial File Transfer Protocol response message to the plurality of interconnected modules via the inter-module communication logic.

18. The module of claim 1, wherein:

the module is the base module; and the local handlers are operably coupled to configure the plurality of interconnected modules to operate as an integrated unit and broadcast an Address Resolution Protocol request message including an Internet Protocol address and a Medium Access Control address that is associated with the module.

19. The module of claim 1, wherein:

the module is a non-base module; and the local handlers are operably coupled to detect a failure of the base module, reconfigure a number of remaining interconnected modules to operate as an integrated unit, and broadcast an Address Resolution Protocol request message including an Internet Protocol address and a Medium Access Control address that is associated with the module.

20. A computer program product comprising a computer readable medium having embodied therein a computer program for managing a module operating among a plurality of interconnected modules including a base module and at least one non-base module, the computer program comprising:

database interface logic programmed to maintain a number of module-specific objects and parameters and a number of stack-wide objects and parameters comprising at least one network management object in a management database, the stack-wide objects and parameters being common to the base module and the at least one non-base module;

management interface logic programmed to communicate with a network manager;

inter-module communication logic programmed to communicate with the plurality of interconnected modules;

local handlers programmed to process network management information received from the network manager via the management interface logic and from the other interconnected modules via the inter-module communication logic, and to send network management information to the other interconnected module; and service logic programmed to receive a protocol message from the management interface logic and to direct the protocol message to the local handlers, if the module is the base module or the protocol message is not one of a number of protocol messages requiring synchronization of mutual exclusion among the various interconnected modules, and to the base module via the inter-module communication logic, if the module is a non-base module and the protocol message is one of the number of protocol messages requiring synchronization or mutual exclusion among the various interconnected modules.

21. The computer program product of claim 20, wherein:

the protocol message is a request to read a parameter; and the service logic is programmed to forward the protocol message to the local handlers.

22. The computer program product of claim 21, wherein the request to read the parameters is a Simple Network Management Protocol get request.

23. The computer program product of claim 21, wherein the request to read the parameter is a Simple Network Management Protocol get-next request.

24. The computer program product of claim 21, wherein the local handlers are programmed to determine whether the requested parameter is maintained by the module or by a cooperating module; retrieve the requested parameter from the at least one management database via the database interface logic, if the requested parameters is maintained by the module; retrieve the requested parameter from the cooperating module via the inter-module communication logic, if the requested parameter is maintained by the cooperating module; and send a response including the requested parameter.

25. The computer program product of claim 20, wherein:

the module is a non-base module;

the protocol message is a request requiring synchronization or mutual exclusion among the plurality of interconnected modules; and the service logic is programmed to forward the protocol message to the base module via the inter-module communication logic.

26. The computer program product of claim 25, wherein the request is a request to write a parameter.

27. The computer program product of claim 26, wherein the request to write the parameter is a Simple Network Management Protocol set request.

28. The computer program product of claim 25, wherein the request is a Bootstrap Protocol response message.

29. The computer program product of claim 25, wherein the request is a TELNET message.

30. The computer program product of claim 25, wherein the request is a web message.

31. The computer program product of claim 20, wherein:

the protocol message is an Address Resolution Protocol message; and the service logic is programmed to forward the Address Resolution Protocol message to the local handlers.

32. The computer program product of claim 31, wherein the local handlers are programmed to distribute the Address Resolution Protocol message to the plurality of interconnected modules via the inter-module communication logic.

33. The computer program product of claim 20, wherein:

the module is the base module;

the local handlers are programmed to monitor a predetermined set of parameters, compare the predetermined set of parameters to a predetermined set of trap criteria, and generate a trap message upon determining that the predetermined set of parameters meets a trap criterion.

34. The computer program product of claim 20, wherein the local handlers are programmed to maintain a portion of information relating to a stack-wide parameter, distribute the portion of information to the other cooperating modules via the inter-module communication logic, receive from the other cooperating modules via the inter-module communication logic portions of information relating to the stack-wide parameter, and calculate the stack-wide parameter based upon the portion of information maintained by the module and the portions of information received from each of the other cooperating modules.

35. The computer program product of claim 20, wherein:

the protocol message is Trivial File Transfer Protocol response message; and the service logic is programmed to forward the Trivial File Transfer Protocol response message to the local handlers.

36. The computer program product of claim 35, wherein the local handlers are programmed to distribute the Trivial File Transfer Protocol response message to the plurality of interconnected modules via the inter-module communication logic.

37. The computer program product of claim 20, wherein:

the module is the base module; and the local handlers are programmed to configure the plurality of interconnected modules to operate as an integrated unit and broadcast an Address Resolution Protocol request message including an Internet Protocol address and a Medium Access Control address that is associated with the module.

38. The computer program product of claim 20, wherein:

the module is a non-bas module; and the local handlers are programmed to detect a failure of the base module, reconfigure a number of remaining interconnected modules to operate as an integrated unit, and broadcast an Address Resolution Protocol request message including an Internet Protocol address and a Medium Access Control address that is associated with the module.

* * * * *

UNITED STATES PATENT AND TRADEMARK OFFICE

CERTIFICATE OF CORRECTION

PATENT NO. : 6,981,034 B2
DATED : December 27, 2005
INVENTOR(S) : Da-Hai Ding, Luc A. Pariseau and Brenda A. Thompson It is certified that error appears in the above-identified patent and that said Letters Patent is hereby corrected as shown below:

Column 22,
Line 28, delete “stuck-wide” and insert -- stack-wide --.

Column 24,
Line 52, delete “non-bas” and insert -- non-base --.

Signed and Sealed this

Eighteenth Day of April, 2006

JON W. DUDAS
*Director of the United States Patent and Trademark Office*